United States Patent [19]

Oglesby

[11] Patent Number: 4,854,846
[45] Date of Patent: Aug. 8, 1989

[54] METHOD AND APPARATUS FOR MAKING A PLURALITY OF FLEXIBLE HOSES EACH HAVING A PREFORMED BEND THEREIN

[75] Inventor: Donald L. Oglesby, Ocala, Fla.

[73] Assignee: Dayco Products, Inc., Dayton, Ohio

[21] Appl. No.: 153,757

[22] Filed: Feb. 8, 1988

[51] Int. Cl.$^4$ .............................................. B31C 1/00
[52] U.S. Cl. .................................. 425/391; 156/194; 156/245; 156/500; 264/151; 264/159; 264/209.3; 264/281; 425/392
[58] Field of Search ............... 156/425, 428, 429, 195, 156/149, 193, 194, 245, 500; 242/47.01, 47.08, 47.10; 264/281, 209.1, 209.3, 151, 159; 425/391, 392; 249/59, 180

[56] References Cited

U.S. PATENT DOCUMENTS

| | | | |
|---|---|---|---|
| 2,544,119 | 3/1951 | Wolfe | 138/61 |
| 2,544,120 | 3/1951 | Wolfe | 138/61 |
| 2,619,125 | 11/1952 | Eickmeyer et al. | 138/49 |
| 2,658,256 | 11/1953 | Van Dijck | 242/47.1 |
| 2,963,233 | 12/1960 | Riegler | 242/47.1 |
| 3,021,871 | 2/1962 | Rodgers | 138/118 |
| 3,038,523 | 6/1962 | Merck et al. | 156/149 X |
| 3,288,169 | 11/1966 | Moss | 138/118 |
| 3,414,448 | 12/1968 | Harpfer | 156/149 |
| 3,826,288 | 7/1974 | Cooper et al. | 138/118 |

FOREIGN PATENT DOCUMENTS

724472 2/1955 United Kingdom ............... 264/281

OTHER PUBLICATIONS

Prior known method of winding hose material about a pair of stationary post means.

Primary Examiner—David Simmons
Attorney, Agent, or Firm—Joseph V. Tassone

[57] ABSTRACT

A method and apparatus of making a plurality of flexible hoses each having a preformed bend section between opposed ends of the hose that tends to return to the shape of its preformed bend section when unbent therefrom are provided, the method comprising the steps of winding a continuous length of a hose material around a pair of spaced apart substantially cylindrical posts so that a plurality of sections of the hose material extends between the posts, heat curing the hose material while the same is in the wound condition thereof on the posts, and, thereafter, cutting the plurality of hoses from the thus cured hose material so that each hose has the preformed bend section therein that was defined by its wound relation with the post, the step of winding the hose material around the posts comprising the step of orbiting the posts about an axis that is substantially parallel to the longitudinal axes of the posts.

4 Claims, 2 Drawing Sheets

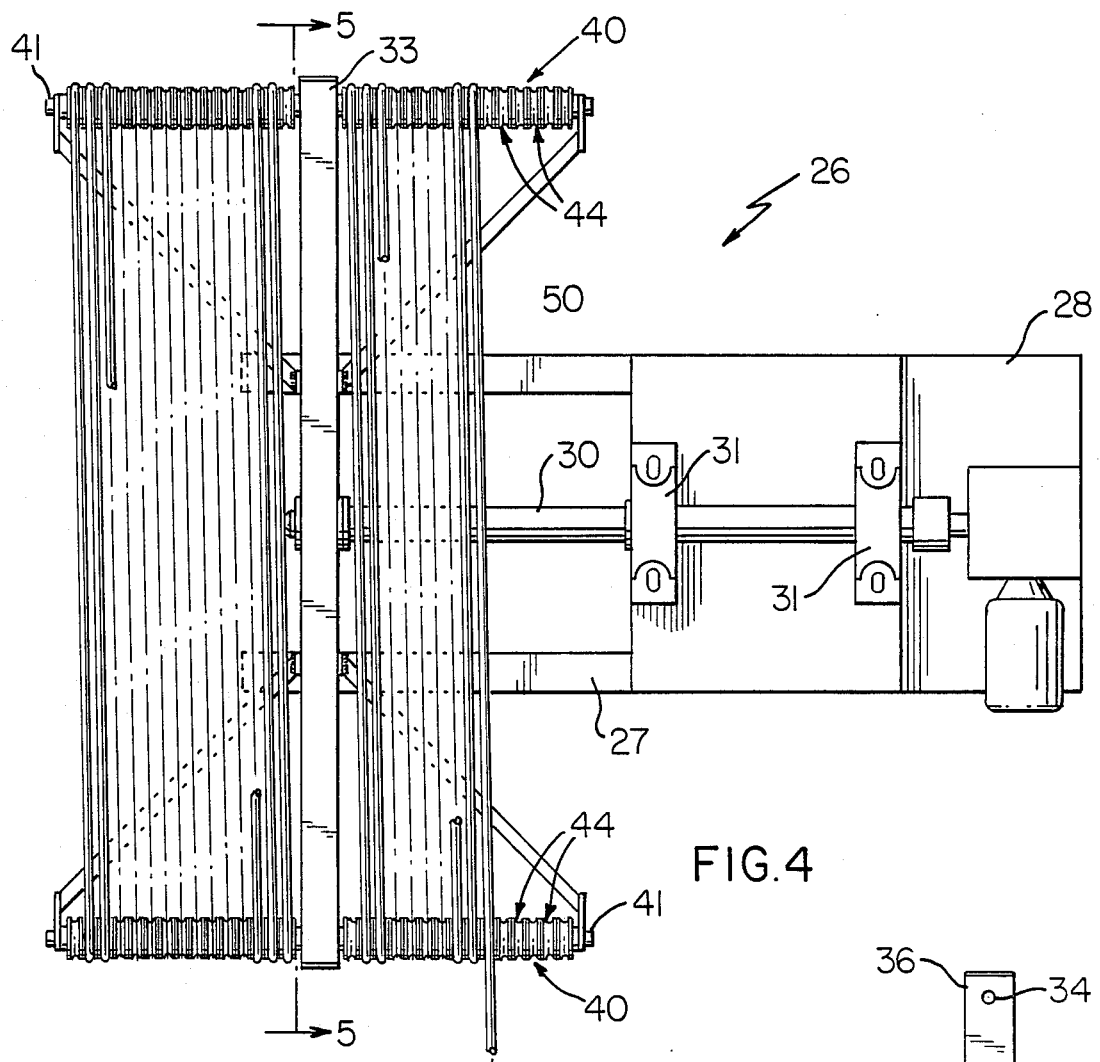
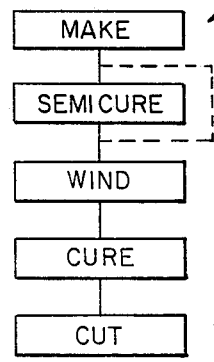
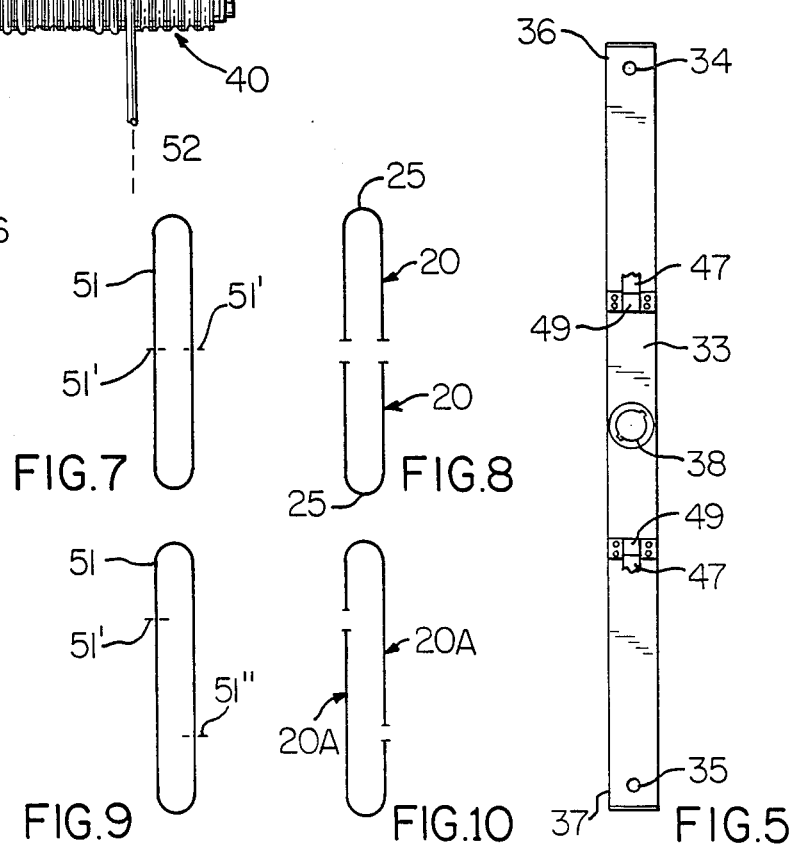

METHOD AND APPARATUS FOR MAKING A PLURALITY OF FLEXIBLE HOSES EACH HAVING A PREFORMED BEND THEREIN

BACKGROUND OF THE INVENTION

1. Field of the Invention

This invention relates to a method and apparatus for making a plurality of flexible hoses each having preformed bend means between opposed ends of the hose that tends to return to the shape of its preformed bend means when unbent therefrom.

2. Prior Art Statement

It is known to form a plurality of flexible hoses each having preformed bend means between opposed ends of the hose that tends to return to the shape of its preformed bend means when unbent therefrom, the method comprising the steps of winding a continuous length of a hose means around a pair of spaced apart substantially cylindrical post means so that a plurality of sections of the hose means extend between the post means, heat curing the hose means while the same is in the wound condition thereof on said post means and, thereafter, cutting the plurality of hoses from the thus cured hose means so that each hose has the preformed bend means therein that was defined by its wound relation with the post means. The post means comprise a pair of spaced apart stationary rods each having a plurality of annularly grooved pulley-like members telescopically disposed in axially aligned relation on the rods and the hose means is wound by hand around the post means so that the hose means is received in the grooves of the pulley-like members.

For other prior known examples of hoses that have preformed bend means between opposed ends of the hose that tend to return to the shape of its preformed bend means when unbent therefrom, see the U.S. Pat. Nos. 3,021,871 to Rodgers; to Moss, 3,288,169 and the Cooper et al, 3,826,288.

For examples of hoses on gasoline pumps that have preformed bend means between opposed ends thereof that tend to return to the shape of its preformed bend means when unbent therefrom, see the U.S. Pat. Nos. 2,544,119 to Wolfe; to Wolfe 2,544,120 and Eickmeyer et al, 2,619,125.

SUMMARY OF THE INVENTION

It is one feature of this invention to provide a new method and apparatus for making a plurality of flexible hoses each having preformed bend means between opposed ends of the hose that tends to return to the shape of its preformed bend means when unbent therefrom, the new method and apparatus having unique means for winding the hose means on the post means for making the preformed bend means thereof.

In particular, it was found according to the teachings of this invention that the hose means can be wound around the pair of spaced apart substantially cylindrical post means to define the bend means for the resulting hoses in a relatively rapid manner if the post means are orbitted about an axis that is disposed substantially parallel to the axes of the post means rather than to wind the hose means by hand around the stationary post means as in the prior known manner.

For example, one embodiment of this invention provides a method of making a plurality of flexible hoses each having preformed bend means between opposed ends of the hose that tends to return to the shape of its preformed bend means when unbent therefrom, the method comprising the steps of winding a continuous length of hose means around a pair of spaced apart substantially cylindrical post means so that a plurality of sections of the hose means extend between the post means, heat curing the hose means while the same is in the wound condition thereof on the post means, and, thereafter, cutting the plurality of hoses from the thus cured hose means so that each hose has the preformed bend means therein that was defined by its wound relation with the post means, the step of winding the hose means around the post means comprising the step of orbiting the post means in unison about an axis that is substantially parallel to the longitudinal axes of the post means.

Accordingly, it is an object of this invention to provide a new method of making a plurality of flexible hoses each having preformed bend means between opposed ends of the hose that tend to return to the shape of its preformed bend means when unbent therefrom, the method of this invention having one or more of the novel features of this invention as set forth above or hereinafter shown or described.

Another object of this invention is to provide a new hose made by the method of this invention.

Another object of this invention is to provide a new apparatus for making a plurality of flexible hoses each having preformed bend means between opposed ends of the hose that tends to return to the shape of its preformed bend means when unbent therefrom, the apparatus of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

BRIEF DESCRIPTION OF THE DRAWINGS

FIG. 4 is a fragmentary top view of the new apparatus illustrated in FIG. 2 and is taken in the direction of the arrows 4—4 of FIG. 2.

FIG. 5 is a reduced end view of the frame or beam means of the apparatus of FIGS. 2 and 4 that hold the post means in the spaced apart relation thereof, FIG. 5 being taken in the direction of the arrows 5—5 of FIG. 4.

FIG. 6 is a block diagram illustrating the various steps in the method of this invention.

FIG. 7 is a schematic view illustrating a length of hose material that has been formed on the apparatus of FIGS. 2 and 4 before the same has been cut into a pair of like hoses.

FIG. 8 is a view similar to FIG. 7 and illustrates how the hose material of FIG. 7 has been cut to form two like U-shaped hoses.

FIG. 9 is a view similar to FIG. 7 and indicates where the same can be cut in a manner to form two like hoses.

FIG. 10 is a view similar to FIG. 9 and illustrates the hose material of FIG. 9 after the same has been cut to form two like J-shaped hoses.

DESCRIPTION OF THE PREFERRED EMBODIMENTS

Figure 1:
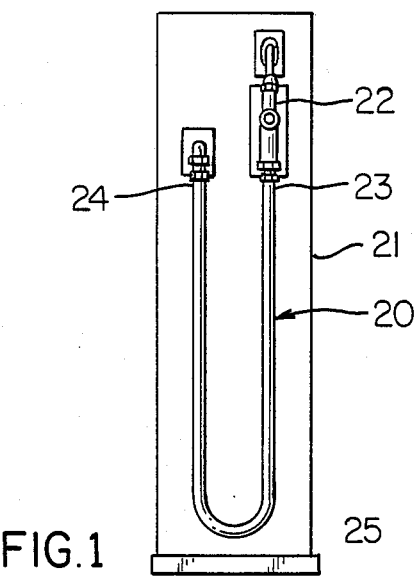
FIG. 1 is a side view of a conventional gasoline pump at a filling station or the like and utilizing a hose of this invention.

While the various features of this invention are hereinafter illustrated and described as being particularly adapted to provide hoses adapted to be utilized with conventional gasoline pumps at conventional filling stations or the like, it is to be understood that the various features of this invention can be utilized singly or in various combinations thereof to provide hoses for other purposes as desired.

Therefore, this invention is not to be limited to only the embodiment illustrated in the drawings, because the drawings are merely utilized to illustrate one of the wide variety of uses of this invention.

Referring now to FIG. 1, a new hose of this invention is generally indicated by the reference numeral 20 and is being utilized with a conventional gasoline pump 21 for dispensing fuel from the pump 21 thereof through a conventional nozzle means 22 when the nozzle means 22 is inserted into the fill pipe of a transportation vehicle or the like and activated in a manner well known in the art, the hose 20 having one end 23 interconnected to the nozzle 22 and the other end 24 thereof interconnected to the pump 21 in a manner well known in the art.

The hose 20 is substantially U-shaped and has a preformed bend means 25 therein that tends to return to the U-shape thereof illustrated in FIG. 1 even when the hose 20 has been unbent in order to fill a gasoline tank or the like of a transportation vehicle in a conventional dispensing manner.

The hose 20 of this invention with its preformed bend means 25 is particularly adapted to be utilized with the shorter gasoline pumps 21 now being manufactured by pump manufacturers that give the operator of the filling station a better field of view from a centralized location. However, the shorter pumps have a problem if the nozzle hose thereof hangs out away from the pump and thereby causeshazards, such as the possiblity of the hose being caught on a bumper of a transportation vehicle, being tripped over, being crushed by car tires, etc. With the preformed bend means 25 in the hose 20 of this invention, the preformed bend means 25 causes the hose 20 to hang closer to the pump 21 and thereby eliminates the bulging of the hose relative to the pump 21.

The method and apparatus of this invention for forming the hose 20 of this invention are generally indicated by the reference numeral 26 in FIGS. 2, 4 and 6 and will now be described.

Figure 2:
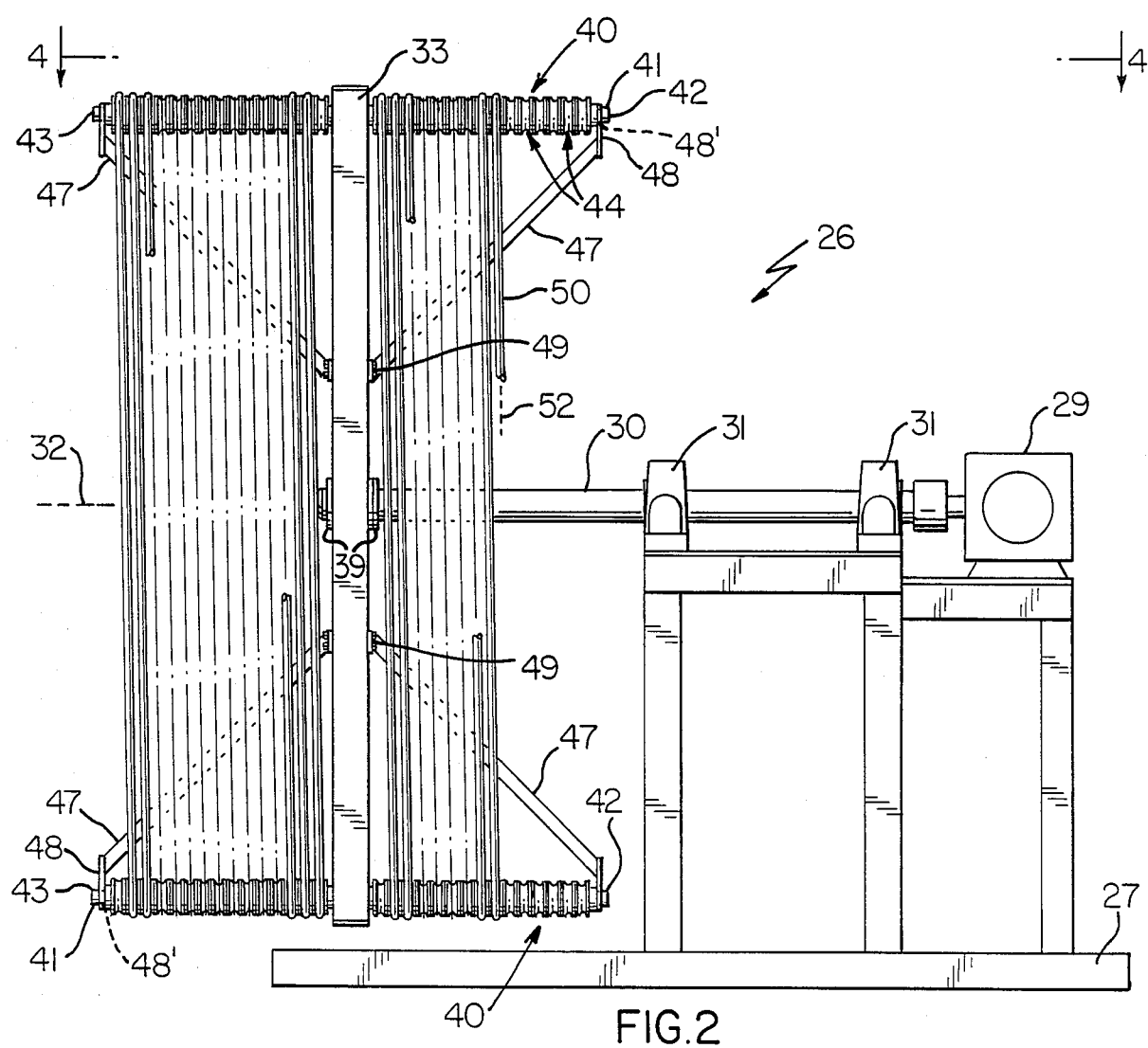
FIG. 2 is a fragmentary side view of the new apparatus of this invention for making a plurality of hoses of the type illustrated in FIG. 1.

The apparatus 26 includes a base means 27 carrying a suitable table means 28 which supports an electrical motor means 29 above the base 27, the motor means 29 having an output rotatable shaft means 30 supported for rotation in suitable bearing means 31 as illustrated whereby the motor means 29 is adapted to rotate the shaft means 30 about a substantially horizontally disposed axis 32 as illustrated in FIG. 2 for a purpose hereinafter set forth.

The apparatus 26 includes a substantially elongated frame or beam means 33 that has suitable opening means 34 and 35 formed transversely through the respective opposed ends 36 and 37 thereof as well as a central opening 39 passing transversely therethrough and being adapted to be telescoped onto the shaft means 30 and be detachably secured thereto by suitable fastening means 39, the opening means 38 and shaft means 30 being constructed in a conventional manner so as to spline the same together so that the beam means 33 will rotate in unison with the shaft 30 while permitting the beam means 33 to be readily removed therefrom when desired.

The beam means 33 carries a pair of post means at each end 36 and 37 thereof, the post means being generally indicated by the reference numeral 40 and each being formed in the same manner so that the same reference numerals will be utilized for each post means 40.

In particular, each post means 40 comprises a substantially cylindrical rod or shaft 41 that is telescopically disposed through a respective opening 34 or 35 of the beam 33 so that a medial portion of the rod 41 is disposed in the opening 34 or 35 as illustrated whereby the opposed ends 42 and 43 of the particular rod 41 extend outwardly from the beam means 33 in such a manner that the longitudinal axis of the respective rod 41 is disposed substantially parallel to the axis 32 of the shaft 30 and in spaced relation relative thereto.

Figure 3:
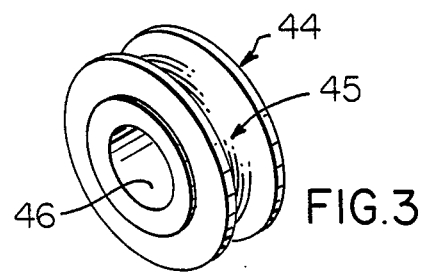
FIG. 3 is an enlarged perspective view illustrating one of the pulley-like members that is utilized to form the post means of the apparatus of FIG. 2.

Each post means 40 also includes a plurality of pulley-like members 44, each pulley-like member 44 being best illustrated in FIG. 3 and having an annular groove 45 therein and a central opening 46 passing therethrough. The groove 45 of each pulley-like member 44 is defined by a radius that is slightly larger than the radius of the hose 20 as will be apparent hereinafter.

A plurality of pulley-like members 44 are disposed on each end 42 and 45 of each rod 41 so as to be disposed in axially aligned relation as illustrated, the pulley-like members 44 being freely rotatable on each rod 41 and relative to each other but being held thereon by being stacked between the beam 33 and a pair of like bracing support members 47 that each has an end 48 with an opening 48' therein telescoped onto the respective end 42 or 43 of the respective rod 41 and an inner end 49 fastened to the support beam 33 as illustrated.

In this manner the post means 40 are disposed in spaced apart relation by the beam means 33 and are adapted to have a substantially continuous length of hose means or material 50 wound thereon by being looped around successive pulley-like members 44 in a winding manner from one end of the post means 44 to the other end thereof as illustrated in FIGS. 2 and 4 as the shaft means 30 is rotated so that substantially elongated looped sections 51 of the hose material 50 will be defined between the post means 40 in the manner illustrated in FIGS. 7 and 9 for a purpose hereinafter set forth, each hose section 51 having two bend means 25 therein as defined by the hose material 50 being looped around the post means 40.

The apparatus 26 of this invention can be utilized to make a plurality of hoses 20 by the method of this invention which will now be described.

The hose material 50 is formed in a continuous length from any suitable material, such as any suitable polymeric material and, in particular, from any suitable material for the gasoline pump use as illustrated in FIG. 1 and in a manner well known in the art. After the hose material 50 has been formed, the same is wound onto the post means 40 of the apparatus 26 by rotating the shaft 30 with the motor means 29 so that the material 50 is wound up on the post means 40 from one end thereof to the other end thereof to form a plurality of looped sections 51 between the post means 40 as illustrated. The wound up hose means 50 is then heat cured when the material of the hose means 50 is of the type that requires heat curing thereof or is heat set when the material of the hose means 50 is of the thermoset type, so as to preform and set the bend means 25 therein.

For example, the entire apparatus 26 could be disposed in a heat curing oven or the beam means 33 could be uncoupled from the shaft means 30 of the apparatus 26 and the beam means 33 together with its post means 40 having the hose means 50 wound thereon can be placed in the heating chamber for the heat curing and/or heat setting operation.

Thereafter, the heat cured hose means 50 can then be cut in any suitable manner either while on the post means 40 or after being removed therefrom so that each looped section 51 can be cut at points 51' as illustrated in FIG. 7 to define two like U-shaped hoses 20 as illustrated in FIG. 8 to be utilized with the pump means 21 in the manner previously set forth. Of course, each section 51 could be cut in a different manner such as at the points 51'' as illustrated in FIG. 9 to define two hoses 20A that are substantially J-shaped as illustrated in FIG. 10.

In any event, it can be seen that the bend means 25 that has been preformed in each resulting hose 20 or 20A tends to cause that resulting hose 20 or 20A to return to its preformed shape after the same has been unbent therefrom for the reasons previously set forth as well as for the reasons set forth in the aforementioned six U.S. Pat. Nos., 3,021,871; 3,288,169; 3,826,288; 2,544,120 and 2,619,125 whereby these six U.S. patents are being incorporated into this disclosure by this reference thereto.

If desired, the hose means 50 can have a flexible mandrel disposed therein when the hose material 50 is wound onto the post means 40 so as to further cooperate with the grooves 45 in the pulley-like members 44 to tend to prevent flat spots in the resulting bend means 25 of the hose material 50 during the winding and/or heat curing operation thereon, such mandrel being generally indicated by the dash line 52 in FIGS. 2 and 4. Of course, such mandrel 52 would be removed from the hose material 50 after the curing operation and before the cutting operation or the mandrel 52 could be cut with the hose material 50 and then be removed from the resulting individual hoses 20 as desired.

It has also been found, according to the teachings of this invention, that the hose material 50 can be semi-cured before the same is wound on the post means 40 of the apparatus 26 and then be final cured after the same has been wound on the post means 40 of the apparatus 26 in the manner previously described.

For example, the hose material 50 can be made on a mandrel in a conventional manner and be sheathed with a conventional sheath. The sheathed hose material 50 is then semi-cured for approximately 15 minutes at 315° F. The sheath is then stripped off of the material 50 and the mandrel is blown out of the same. Thereafter, the hose material 50 is wound onto the post means 40 of the apparatus 26 in the manner previously described and then the wound hose material 50 is cured a second time for approximately 45 minutes at 315° F.

Therefore, it can be seen that the mandrel can be utilized with the apparatus 26 or before as desired.

Therefore, it can be seen that this invention not only provides a new method and apparatus for making a plurality of flexible hoses each having preformed bend means between opposed ends of the hose that tend to return to the shape of its preformed bend means when unbent therefrom, but also this invention provides a new hose made by such new method and apparatus.

While the forms and methods of this invention now preferred have been illustrated and described as required by the Patent Statute, it is to be understood that other forms and method steps can be utilized and still fall within the scope of the appended claims wherein each claim sets forth what is believed to be known in each claim prior to this invention in the portion of each claim that is disposed before the terms "the improvement" and sets forth what is believed to be new in each claim according to this invention in the portion of each claim that is disposed after the terms "the improvement" whereby it is believed that each claim sets forth a novel, useful and unobvious invention within the purview of the Patent Statute.

What is claimed is:

1. An apparatus for making a plurality of flexible hoses each having preformed bend means between opposed ends of said hose that tends to return to the shape of its preformed bend means when unbent therefrom, said apparatus comprising a pair of spaced apart substantially cylindrical post means having opposed ends and about which a continuous length of a hose means can be wound so that a plurality of sections of the hose means extend between said post means whereby a subsequent heat curing of said wound hose means permits the cutting of said plurality of hoses from said cured hose means so that each hose has said preformed bend means therein that was defined by its wound relation with said post means, the improvement comprising means for orbiting said post means in unison about an axis that is substantially parallel to the longitudinal axes of said post means so as to wind said hose means around said post means, and a frame means supporting said post means in said spaced apart relation thereof, said means for orbiting said post means comprising a rotatable shaft means attached to said frame means, said frame means comprising a single elongated beam means having opposed ends, said opposed ends having opening means passing transversely therethrough and respectively receiving medial portions of said post means therein to support said post means in said spaced apart relation thereof, and a plurality of support members having opposed ends that are respectively interconnected to said ends of said post means and to a medial portion of said beam means.

2. An apparatus as set forth in claim 1 wherein said post means each comprises a plurality of annularly grooved pulley-like members disposed in axially aligned relation so that said hose means is adapted to be received in the grooves of said pulley-like members when said hose means is wound around said post means by the orbiting of said post means.

3. An apparatus as set forth in claim 2 wherein each said pulley-like member has an opening passing through the center thereof, each said post means comprising a rod means disposed through said openings of its respective pulley-like members whereby each post means comprises a plurality of said pulley-like members telescopically disposed in axially aligned relation on a rod means.

4. An apparatus as set forth in claim 1 wherein shaft means is detachably interconnected to said medial portion of said beam means.

* * * * *